(12) United States Patent
Choi et al.

(10) Patent No.: US 9,059,623 B2
(45) Date of Patent: Jun. 16, 2015

(54) LINEAR VIBRATOR

(71) Applicant: SAMSUNG ELECTRO-MECHANICS CO., LTD., Suwon (KR)

(72) Inventors: Jun Kun Choi, Suwon (KR); Kwang Hyung Lee, Suwon (KR); Hwa Young Oh, Seoul (KR)

(73) Assignee: SASMUNG ELECTRO-MECHANICS CO., LTD., Suwon (KR)

( * ) Notice: Subject to any disclaimer, the term of this patent is extended or adjusted under 35 U.S.C. 154(b) by 0 days.

(21) Appl. No.: 13/770,490

(22) Filed: Feb. 19, 2013

(65) Prior Publication Data

US 2013/0154400 A1 Jun. 20, 2013

Related U.S. Application Data

(63) Continuation of application No. 13/064,182, filed on Mar. 9, 2011, now Pat. No. 8,736,121.

(30) Foreign Application Priority Data

Nov. 17, 2010 (KR) ........................ 10-2010-0114596

(51) Int. Cl.
*H02K 33/00* (2006.01)
*H02K 7/06* (2006.01)
*B06B 1/04* (2006.01)
(Continued)

(52) U.S. Cl.
CPC ............... *H02K 33/00* (2013.01); *B06B 1/045* (2013.01); *H02K 1/02* (2013.01); *H02K 5/225* (2013.01); *H02K 33/02* (2013.01); *H02K 33/18* (2013.01)

(58) Field of Classification Search
CPC ............................... H02K 7/063; H02K 7/061
USPC ............................... 310/12.16, 15, 71, 81, 25
See application file for complete search history.

(56) References Cited

U.S. PATENT DOCUMENTS 6,404,085 B2 * 6/2002 Hamaguchi et al. ............ 310/81
6,810,128 B2 10/2004 Kaneda et al.
(Continued)

FOREIGN PATENT DOCUMENTS

CN 101045229 A 10/2007
CN 101316065 A 12/2008
(Continued)

OTHER PUBLICATIONS

U.S. Appl. No. 13/064,182, filed Mar. 9, 2011, Jun Kun Choi et al., Samsung Electro-Mechanics Co., Ltd.
(Continued)

*Primary Examiner* — Terrance Kenerly

(57) ABSTRACT

A linear vibrator, including: a fixing part providing an inner space having a predetermined size; at least one magnet disposed in the inner space of the fixing part to generate a magnetic force; a vibration part including a coil disposed to face the magnet to generate electromagnetic force by interacting with the magnet, and a mass body being vibrated; an elastic member coupled to the fixing part and the vibration part to provide an elastic force; and a substrate coupled to the vibration part and disposed to surround at least a portion of an outer circumferential surface of the magnet so as to prevent the substrate from contacting the magnet when the vibration part is vibrated.

13 Claims, 7 Drawing Sheets

(51) Int. Cl.
*H02K 1/02* (2006.01)
*H02K 5/22* (2006.01)
*H02K 33/02* (2006.01)
*H02K 33/18* (2006.01)

(56) References Cited

U.S. PATENT DOCUMENTS

| | | | |
|---|---|---|---|
| 2005/0184601 A1 | 8/2005 | Kweon et al. | |
| 2005/0225181 A1* | 10/2005 | Tu et al. | 310/12 |
| 2006/0001324 A1 | 1/2006 | Won et al. | |
| 2006/0202566 A1* | 9/2006 | Osaka | 310/12 |
| 2006/0233415 A1* | 10/2006 | Chung et al. | 381/396 |
| 2007/0194633 A1 | 8/2007 | Ueda et al. | |
| 2007/0194635 A1* | 8/2007 | Miura | 310/15 |
| 2008/0001484 A1* | 1/2008 | Fuller et al. | 310/15 |
| 2009/0121559 A1* | 5/2009 | Lee | 310/28 |
| 2009/0127938 A1 | 5/2009 | Sahin Nomaler et al. | |
| 2009/0146509 A1 | 6/2009 | Aoyagi et al. | |
| 2010/0225586 A1 | 9/2010 | Cheng et al. | |
| 2010/0259113 A1* | 10/2010 | Lee et al. | 310/23 |
| 2010/0277009 A1 | 11/2010 | Jeon | |
| 2011/0068641 A1* | 3/2011 | Choi et al. | 310/25 |
| 2011/0133578 A1* | 6/2011 | Choi | 310/25 |
| 2011/0198949 A1* | 8/2011 | Furuich et al. | 310/25 |
| 2011/0227426 A1* | 9/2011 | Lee et al. | 310/25 |

FOREIGN PATENT DOCUMENTS

| | | |
|---|---|---|
| CN | 101882854 A | 11/2010 |
| JP | 2001-239210 | 9/2001 |
| JP | 2005-269497 | 9/2005 |
| KR | 10-0593900 | 6/2006 |
| KR | 10-2009-0048677 | 5/2009 |
| KR | 10-0923867 | 10/2009 |
| KR | 10-0934584 | 12/2009 |
| KR | 10-2010-0010236 | 2/2010 |
| KR | 10-0984046 | 9/2010 |

OTHER PUBLICATIONS

U.S. Patent Office Action mailed on Apr. 26, 2013 in the related U.S. Appl. No. 13/064,182.
Office Action issued by the State Intellectual Property Office of P.R. China on Oct. 28, 2013 in the corresponding Chinese patent application No. 201110062314.0.
Office Action issued by the U.S. Patent and Trademark Office on Oct. 28, 2013 in related U.S. Appl. No. 13/064,182.
Notice of Allowance issued by the U.S. Patent and Trademark Office on Jan. 17, 2014 in the co-pending U.S. Appl. No. 13/064,182.
Chinese Office Action issued Jul. 11, 2014 in corresponding Chinese Patent Application No. 201110062314.0.

* cited by examiner

LINEAR VIBRATOR

CROSS-REFERENCE TO RELATED APPLICATIONS

This application is a U.S. continuation application filed under 37 CFR 1.53(b) claiming priority benefit of U.S. Ser. No. 13/064,182 filed in the United States on Mar. 9, 2011, which claims earlier foreign priority benefit to Korean Patent Application No. 10-2010-0114596 filed with the Korean Intellectual Property Office on Nov. 17, 2010, the disclosures of which are incorporated herein by reference.

BACKGROUND

1. Field

The present invention relates to a linear vibrator, and more particularly, to a linear vibrator having improved performance and lifespan by preventing a vibration amplitude from being restricted when a vibration part is in vibration.

2. Description of the Related Art

Recently, the release of personal mobile terminals having large LCD screens onto the market has been rapidly increased so as to facilitate user convenience. Therefore, personal mobile terminals have adopted a touch screen scheme and use a vibration motor in order to generate vibrations when the screen is touched.

The vibration motor is a part using a principle of generating an electromagnetic force to convert electrical energy into mechanical vibrations. The vibration motor is mounted on a personal mobile terminal and has been used to indicate an incoming call in a silent mode.

The related art has used a scheme of generating a rotational force to rotate a rotating part of unbalanced mass, thereby obtaining mechanical vibrations. That is, the related art has used a scheme of obtaining mechanical vibrations by performing a rectifying action on the turning force through contact between a brush and a commutator.

However, the brush type structure using the commutator causes mechanical friction and electrical sparking, and generates foreign objects while the brush passes through the space between segments of the commutator when the motor rotates, thereby shortening the lifespan of the motor.

In addition, when voltage is applied to the motor, it takes time to reach the target amount of vibrations, due to rotation inertia, which makes it difficult to implement appropriate vibrations on the touch screen.

In order to overcome the problems of lifespan and response characteristics of the motor and implement the vibration function of the touch screen, a linear vibrator has been mainly used.

The linear vibrator does not use the rotational principle of the motor to generate vibrations. To generate vibrations, the linear vibrator generates resonance by periodically generating an electromagnetic force obtained through a spring mounted in the vibration motor and a mass body hung on the spring according to a resonance frequency.

However, a linear vibrator designed to be vibrated in a vertical direction can generate vibrations by vertically moving the mass body mounted therein, such that the entire thickness of the linear vibrator is able to be limited.

However, personal mobile terminals adopting the linear vibrator have a limited mounting space available for the linear vibrator, such that there is a problem that the thickness of the linear vibrator cannot be sufficiently increased so as to secure a certain level of vibratory force in the linear vibrator.

Therefore, research into securing sufficient vibratory force is urgently needed in order to improve the performance and lifespan of the linear vibrator.

SUMMARY

An aspect of the present invention provides a linear vibrator capable of securing sufficient vibratory force while implementing miniaturization and thinness, by changing a structure of a coil and a magnet generating an electromagnetic force for vibrations and a structure of a substrate for supplying power.

According to an aspect of the present invention, there is provided a linear vibrator, including: a fixing part providing an inner space having a predetermined size; at least one magnet disposed in the inner space of the fixing part to generate a magnetic force; a vibration part including a coil disposed to face the magnet to generate electromagnetic force by interacting with the magnets, and a mass body being vibrated; an elastic member coupled to the fixing part and the vibration part to provide an elastic force; and a substrate coupled to the vibration part and including a through hole through which the magnet passes to prevent the substrate from contacting the magnet when the vibration part is vibrated.

The through hole may be formed to be larger than an outer diameter of the magnet.

The substrate may include an electrode pad formed on the bottom surface thereof and be electrically connected to one end of a lead wire of the coil to transfer electrical signals to the coil.

The electrode pad may be formed at an outer edge of the coil in an outer diameter direction of the coil.

The electrode pad may be electrically connected to the one end of the lead wire of the coil by soldering.

The substrate may include a moving piece coupled to the mass body and vibrated by interworking with the vibration part, and a fixing piece protruded to the outside of the fixing part and coupled to the fixing part, and the electrode pad may be formed on the bottom surface of the moving piece.

The linear vibrator may further include a plate coupled to at least one surface of the magnet and allowing a magnetic flux to smoothly flow to the magnet through the coil.

The plate may be made of a magnetic material.

The through hole may be formed to be larger than the outer diameter of the plate.

The fixing part may include a case having an inner space of a predetermined size and a lower portion opened downwardly, and a bracket sealing the inner space of the case, and the magnet may be coupled to one surface of the bracket or one surface of the case.

The fixing part may include a case having an inner space of a predetermined size and a lower portion opened downwardly, and a bracket sealing the inner space of the case, and the magnet may include a plurality of magnets, and the plurality of magnets are coupled to one surface of the case and one surface of the bracket, respectively.

The linear vibrator may further include: a plate disposed between the magnets and having a top surface and a bottom surface respectively coupled to surfaces of the magnets to allow a magnetic flux to smoothly flow to the magnets via the coil.

The coil may receive a portion of the outer circumferential surface of the magnet, and the central axis of the coil may coincide with the magnetization direction of the magnet.

The linear vibrator may further include a damper coupled to the one surface of the substrate and preventing contact between the vibration part and the fixing part as the vibration part is vibrated.

The linear vibrator may further include a magnetic fluid disposed at an outer surface of the magnet to smooth the vertical motion of the vibration part.

According to another aspect of the present invention, there is provided a linear vibrator, including: a fixing part including a case having an inner space of a predetermined size and a lower portion opened downwardly, and a bracket sealing the inner space of the case; first and second magnets disposed in the inner space of the fixing part, disposed to have the same polarities face each other to generate a magnetic force, and respectively coupled to one surface of the case and one surface of the bracket; a vibration part including a holder fixedly supporting a coil, and a mass body being vibrated, the coil being disposed to face the first and second magnets to generate electromagnetic force by interacting with the first and second magnets; an elastic member coupled to the fixing part and the vibration part to provide an elastic force; and a substrate coupled to the vibration part and including a through hole through which the first and second magnets pass to prevent the substrate from contacting the first and second magnets when the vibration part is vibrated.

The through hole may be formed to be larger than an outer diameter of the first and second magnets.

The substrate may include an electrode pad formed on the bottom surface thereof to be electrically connected to one end of a lead wire of the coil to transfer electrical signals to the coil.

The electrode pad may be formed at the outer edge of the coil in an outer diameter direction of the coil.

BRIEF DESCRIPTION OF THE DRAWINGS

The above and other aspects, features and other advantages of the present invention will be more clearly understood from the following detailed description taken in conjunction with the accompanying drawings, in which.

DESCRIPTION OF EMBODIMENTS

Hereinafter, exemplary embodiments will be described in detail with reference to the accompanying drawings so that they can be easily practiced by those skilled in the art to which the present invention pertains. However, in describing the exemplary embodiments of the present invention, detailed descriptions of well-known functions or constructions are omitted so as not to obscure the description of the present invention with unnecessary detail.

Figure 1:
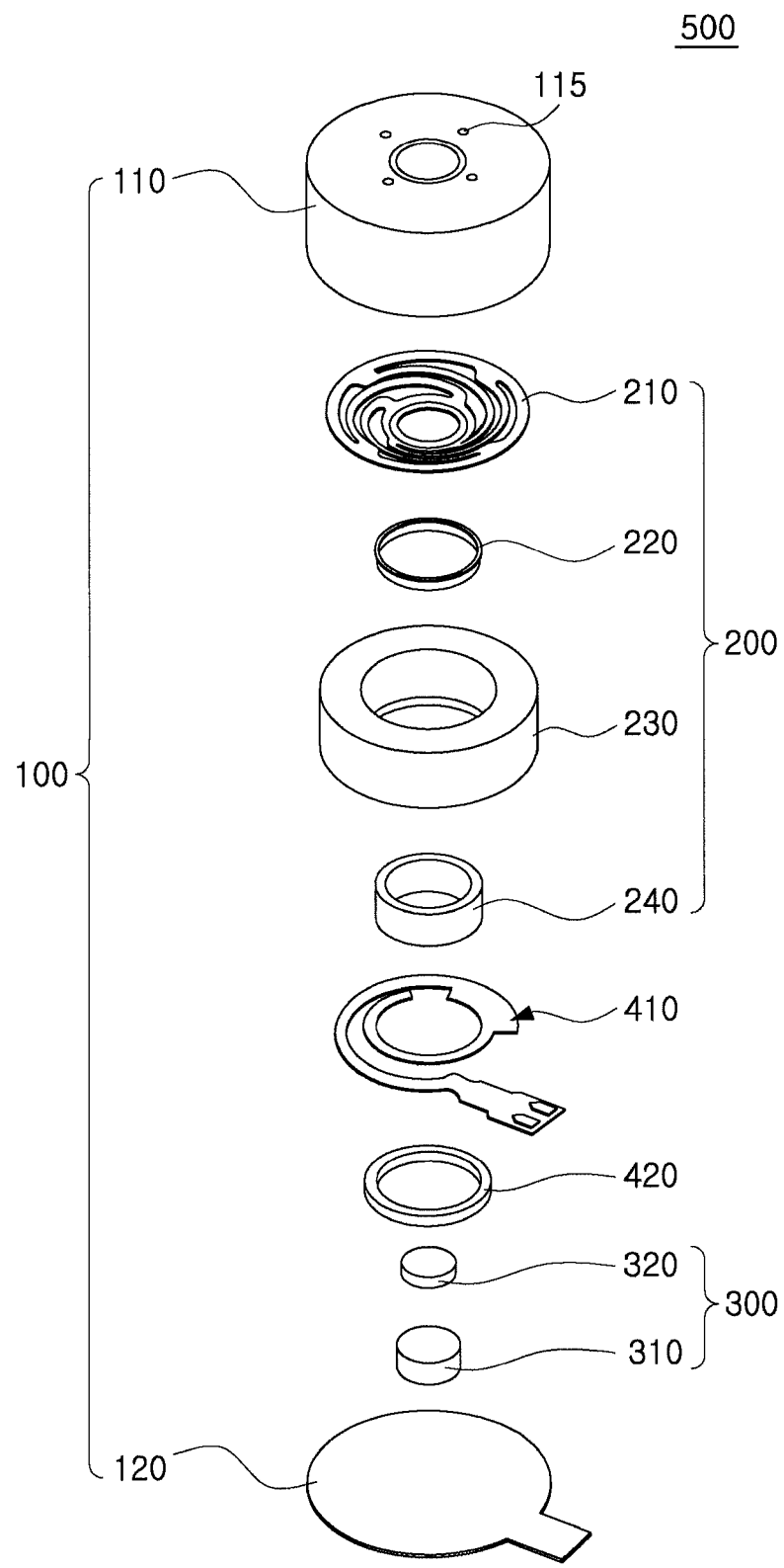
FIG. 1 is a schematic exploded perspective view showing a linear vibrator according to a first exemplary embodiment of the present invention.
Figure 2:
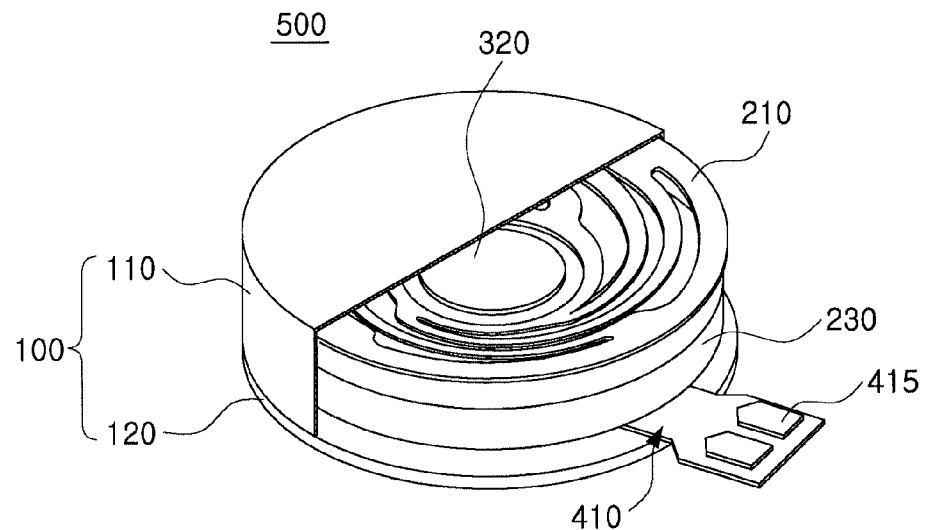
FIG. 2 is a schematic cutoff perspective view showing the linear vibrator according to the first exemplary embodiment of the present invention.

FIG. 1 is a schematic exploded perspective view showing a linear vibrator according to a first exemplary embodiment of the present invention; FIG. 2 is a schematic cutoff perspective view showing the linear vibrator according to the first exemplary embodiment of the present invention; and FIG. 3 is a schematic cross-sectional view showing the linear vibrator according to the first exemplary embodiment of the present invention.

Figure 3:
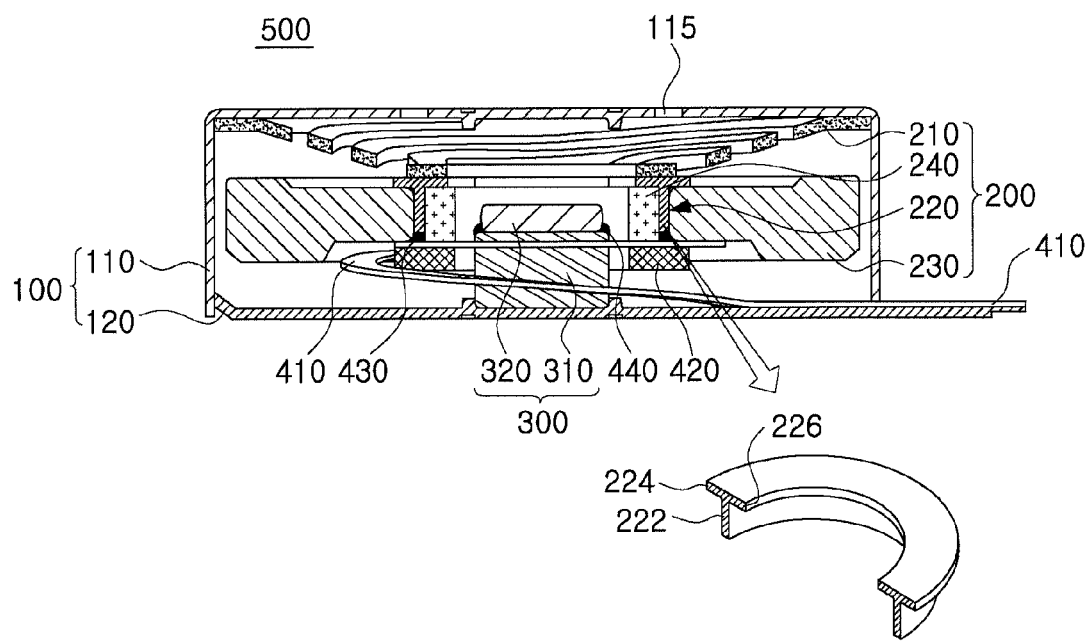
FIG. 3 is a schematic cross-sectional view showing the linear vibrator according to the first exemplary embodiment of the present invention.

Referring to FIGS. 1 to 3, a linear vibrator 500 according to a first exemplary embodiment of the present invention may be configured to include a fixing part 100, a vibration part 200, a magnetic part 300, and a substrate 410.

The fixing part 100 includes a case 110 having a predetermined amount of inner space and a lower portion opened downwardly, wherein the inner space of the case 110, that is, the lower portion of the case 110 opened downward, may be sealed by a bracket 120.

In this configuration, a space for receiving the magnetic part 300, the vibration part 200, or the like, to be described below, is formed by the case 110 and the bracket 120, wherein the case 110 and the bracket 120 may be integrally formed.

Further, the top surface of the case 110 may be provided with at least one injection hole 115 in order to dispose a magnetic fluid 440 to be described below at an outer surface of a magnet 310. In this case, the magnetic fluid 440 can be simply applied through the injection holes 115.

Further, the injection hole 115 may be a hole through which a laser beam penetrates, when an elastic member 210 to be described below is coupled to a holder 220 of the vibration part 200, that is, when the elastic member 210 is coupled to the holder 220 by welding.

In this configuration, the case 110 may be provided with a fixing projection 117 corresponding to a fixing hole 419 (see FIG. 6) formed in a fixing piece 412 of the substrate 410 to be described below in order to fixedly couple the fixing piece 412 with the case 110.

The fixing projection 117 is inserted into the fixing hole 419 to stably fix the substrate 410 to the case 110. However, it is to be noted that the fixing protrusion is not an essential component.

The vibration part 200 may be configured to include a coil 240, the holder 220, a mass body 230, and the elastic member 210. The vibration part 210 is a member capable of being vibrated up and down by the elastic member 210.

The coil 240 may be disposed to face the magnet 310 to be described below, and a portion of the magnet 310 including one surface may be inserted into the space formed by the coil 24.

In this configuration, the coil 240 may have an inner diameter larger than an outer diameter of the magnet 310 and the coil 240 and the magnet 310 may maintain a non-contact state therebetween while the vibration part 200 moves.

Further, the coil 240 may be coupled to a inner surface of the hollow holder 220 and if current having a predetermined frequency is applied to the coil 240, a magnetic field may be induced around the coil 240.

When an electromagnetic force is vibrated through the coil 240, the magnetic flux passing through the coil 240 from the magnet 310 is horizontally formed and the magnetic field generated by the coil 240 is vertically formed, such that the vibration part 200 is vertically vibrated. Therefore, the magnetic flux direction of the magnet 310 and the vibration direction of the vibration part 200 are perpendicular to each other.

That is, when the electromagnetic force is vibrated at an eigenfrequency of the vibration part, the resonance vibration is made to obtain the maximum amount of vibratory force, and the eigenfrequency of the vibration part 200 is influenced by the mass of the vibration part 200 and the elastic modulus of the elastic member 200.

The holder 220 may be coupled to the outer surface of the coil 240. The holder 220 may fixedly support the vibrating mass body 230 to be described below and may be formed in a hollow cylindrical shape of which the upper and lower portions are opened.

In detail, the holder 220 may include a cylindrical vertical part 222 contacting one surface of the coil 240 and the mass body 230, and outer and inner horizontal parts 224 and 226 e extending to a radial inner side and an outer side from the end portion of the vertical part 222 to support the coil 240 and the other surface of the mass body 230.

The outer circumferential surface of the vertical part 222 and the bottom surface of the outer horizontal part 224 contact the mass body 230 to fixedly support the mass body 230 and the inner circumferential surface of the vertical part 222 and the bottom surface of the inner horizontal part 226 may fixedly support the coil 240.

In addition, a material of the holder 220 may be made of iron, which is the same as the material of the elastic member 210. The reason therefore is to make the coupling easy and firm.

However, the material of the holder 220 and the elastic member 210 is not limited to iron. Therefore, any material may be used if the coupling can be easily and firmly made.

The vertical part 222 of the holder 220 may be formed to be placed higher than the bottom surfaces of the coil 240 and the mass body 230 in order to form a space between the coil 240 and the mass body 230, and an adhesive 430 is filled in the space to more firmly couple the coil 240 with the mass body 230.

The mass body 230 is a vibrating body vertically vibrating by being coupled to the outer surface of the vertical part 222 of the holder 220 and the bottom surface of the outer horizontal part 224. The mass body 230 may be provided to have an outer diameter smaller than an inner diameter of the case 110 so that the mass body 230 can be vibrated within the fixing part 100 without contact, when the mass body 230 is vibrated up and down.

Therefore, a gap of a predetermined size may be formed between the inner surface of the case 110 and the outer surface of the mass body 230.

The mass body 230 may be made of a non-magnetic material or a paramagnetic material that is not affected by the magnetic force generated from the magnet 310.

Therefore, the mass body 230 may be made of a material such as tungsten having a greater specific gravity than iron. This is to increase the mass of the vibration part 200 in the same volume to control the resonance frequency, thereby maximizing the vibratory force.

However, a material of the mass body 230 is not limited to tungsten, but may be made of various materials according to a designer's intention.

In this case, in order to correct the eigenfrequency of the linear vibrator 500, the mass body 230 is provided with a space in which a sub-mass body may be additionally inserted, thereby making it possible to increase and reduce the mass of the mass body 230.

As described above, the elastic member 210 is a member that is coupled to the holder 220 and the case 110 to provide an elastic force. The elastic modulus of the elastic member 210 affects the eigenfrequency of the vibration part 200.

In this configuration, the elastic member 210 may be any one of a coil spring and a plate spring, but is not limited thereto. It is to be noted that any elastic member can be used if it can provide an elastic force.

The magnetic part 300 may include the magnet 310 and a plate 320, wherein the magnet 310 may be coupled to the top surface of the bracket 120 configuring the fixing part 100 by a bonding agent.

The magnet 310 may include an outer diameter smaller than the inner diameter of the coil 240 coupled to the holder 220, and may be coupled to the bracket 120 to serve as a fixed member.

However, the top surface of the bracket 120 may include an outer wall protrudedly formed to correspond to the outer diameter of the magnet 310. The outer surface of the magnet 310 is inserted and fixed to the inner surface of the outer wall, so that they can be more firmly coupled together.

In this configuration, the top surface, that is one surface of the magnet 310, may be coupled to the plate 320. The plate 320 serves to smoothly form the magnetic flux flowing to the magnet 310 via the coil 240 generating the electromagnetic force by the interaction with the magnet 310.

The plate 320 may be made of a magnetic material in order to facilitate the application of the magnetic fluid to be described below.

The magnetic fluid 440 may be applied between the outer surfaces of the magnet 310 and the plate 320 and the coil 240, and the magnetic fluid 440 may serve to prevent the abnormal vibrations of the vibration part 200 to be described below The magnetic fluid 440 may be disposed in the gap formed between the magnet 310 and the coil 240 in order to smooth the vertical motion of the vibration part 200, and the magnetic fluid 440 may prevent the abnormal vibrations generated by the vibration part 200 shaking horizontally and vertically due to the external impact.

The magnetic fluid 440 is a material having properties of being collected by the magnetic flux of the magnet 310. When the magnetic fluid 440 is applied to one surface of the magnet 310, it is collected to one point at which the magnetic flux of the magnet 310 is generated, thereby forming a single annular shape.

In this case, the magnetic fluid 440 is prepared by dispersing magnetic powder in a liquid to have a colloidal shape and then adding a surfactant to the liquid so as to prevent the precipitation or agglomeration of the magnetic powder due to gravity, magnetic field, or the like. For example, a magnetic fluid formed by dispersing triiron tetroxide or iron-cobalt alloy particles in oil or water may be used, and, recently, a magnetic fluid formed by dispersing cobalt in toluene, or the like, is being used.

The magnetic powder, which is ultrafine particle powder, performs Brownian motion, such that the concentration of the magnetic powder particles in the fluid is constantly maintained even when an external magnetic field, gravity, centrifugal force, or the like is applied thereto.

In addition, the magnetic fluid 440 occupies a gap between the outer surface of the magnet 310 and the inner surface of the hollow coil 240, such that the vibration part 200 may be smoothly vibrated or slid.

The substrate 410 may be coupled to one surface of the mass body 230 configuring the vibration part 200, and may be provided with a through hole 411 through which the magnet 310 penetrates such that the substrate 410 does not contact the magnet 310 when the vibration part 200 is vibrated.

The through hole 411 can prevent contact between the magnet 310 and the substrate 410 and prevent the amplitude of the vibration part 200 from being limited when the vibration part 200 is vibrated and moved, thereby securing the maximum vibratory force of the vibration part 200.

Therefore, the linear vibrator 500 according to this exemplary embodiment of the present invention can obtain more stable linear vibrations because of the through hole 411. The substrate 410 including the through hole 411 will be described in detail with reference to FIGS. 4 to 6.

In this configuration, the bottom surface of the substrate 410 may be coupled to a damper 420 to prevent the vibration part 200 and the bracket 120 of the fixing part 100 from contacting each other due to the vibrations of the vibration part 200.

The damper 420 may be made of an elastic material to prevent contact caused by the linear motion of the vibration part 200. The damper 420 can prevent the generation of touch noise while preventing the abrasion of the vibration part by preventing the vibration part 200 from contacting the bracket 120 due to the excessive vibrations of the vibration part 200.

In this configuration, the damper 420 may be made of various materials capable of absorbing impact, such as rubber, cork, propylene, poron, or the like, when an external impact occurs.

Figure 4:
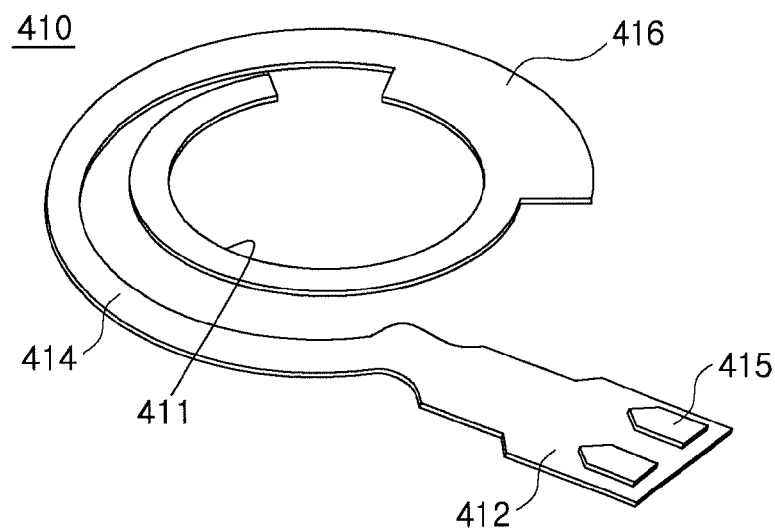
FIG. 4 is a schematic perspective view showing a substrate provided for the linear vibrator according to the first exemplary embodiment of the present invention.
Figure 5:
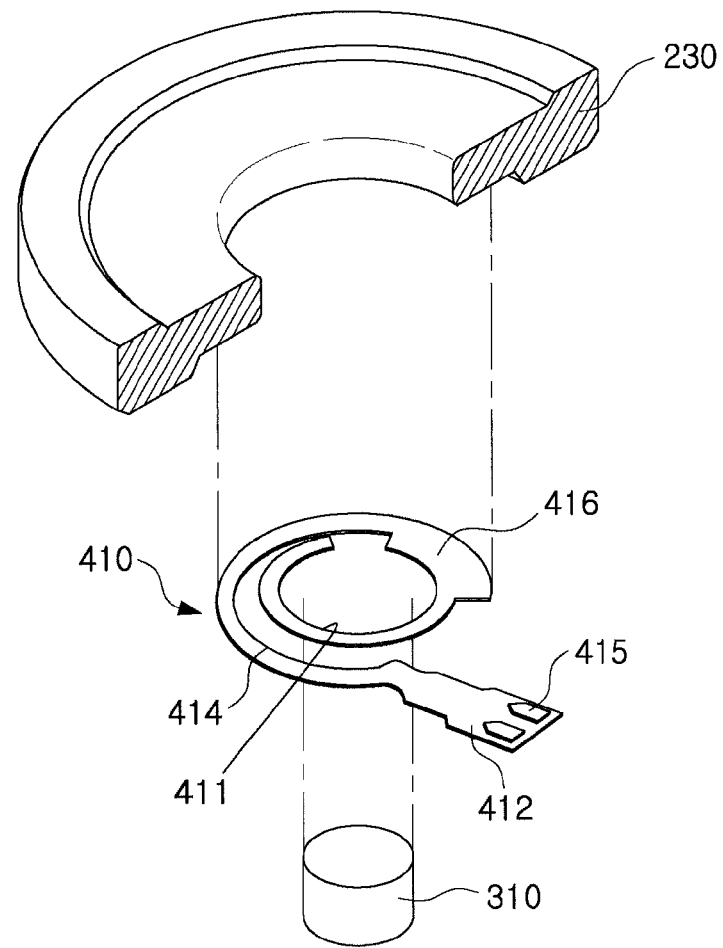
FIG. 5 is a schematic perspective view showing a coupling relationship among a mass body, a substrate, and a magnet provided for the linear vibrator according to the first exemplary embodiment of the present invention.
Figure 6:
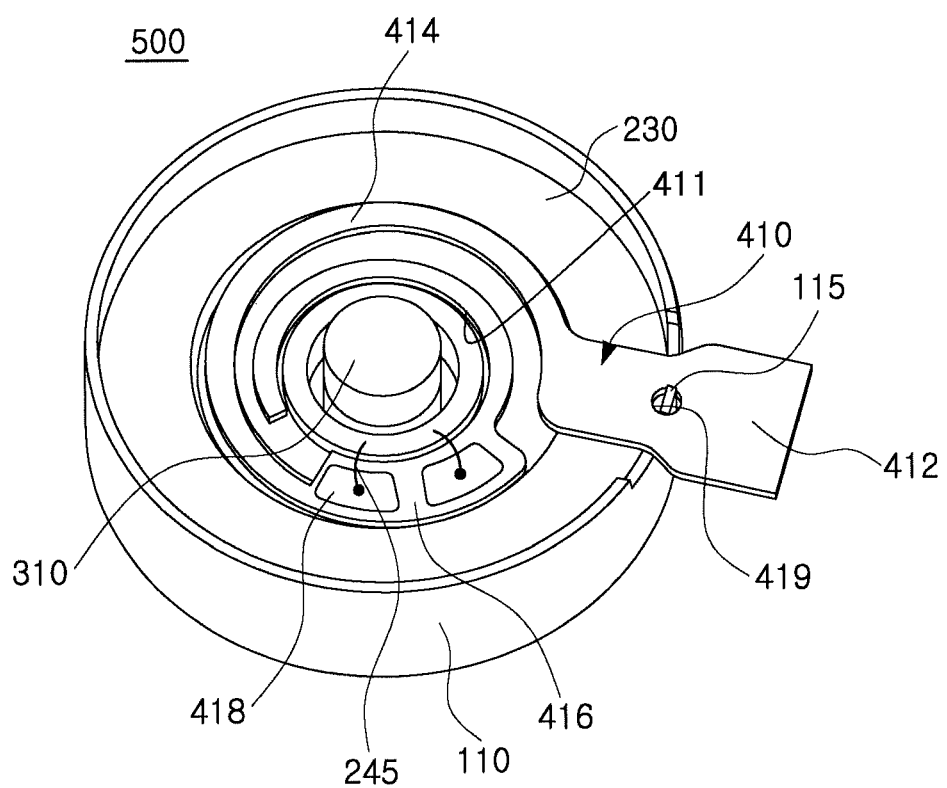
FIG. 6 is a schematic bottom view showing the linear vibrator according to the first exemplary embodiment of the present invention.

FIG. 4 is a schematic perspective view showing a substrate provided for the linear vibrator according to the first exemplary embodiment of the present invention, FIG. 5 is a schematic perspective view showing a coupling relationship among a mass body, a substrate, and a magnet provided for the linear vibrator according to the first exemplary embodiment of the present invention, and FIG. 6 is a schematic bottom view showing the linear vibrator according to the first exemplary embodiment of the present invention.

Referring to FIGS. 4 and 5, the substrate 410 provided in the linear vibrator 500 according to the first exemplary embodiment of the present invention may include a moving piece 416, a fixing piece 412, and a connection piece 414.

In addition, the inner space of the moving piece 416 may imply the through hole 411 through which the magnet 310 fixed to the bracket 120 penetrates.

In other words, the substrate 410 may be coupled to one surface of the mass body 230 configuring the vibration part 200 and may be provided with the through hole 411 through which the magnet 310 penetrates, so that the substrate 410 does not contact the magnet 310 when the vibration part 200 is vibrated.

The through hole 411 will be described below.

The moving piece 416 of the substrate 410 is a member that is vibrated by interworking with the vibration part 200. The top surface of the moving piece 416 may be coupled to the bottom surface of the mass body 230.

However, as shown in FIG. 5, the bottom surface of the mass body 230 may be provided with an area depressed upwardly for the coupling with the moving piece 416. The moving piece 416 may be coupled to the area, but may be directly coupled to the flat bottom surface of the mass body 230 without the area.

The fixing piece 412 may include a power connection terminal 415 for supplying power to the coil 240 and may be protruded to the outside of the case 110.

That is, the fixing piece 412 may be coupled to the case 110 of the fixing part 100 while being protruded to the outside of the case 110.

In this case, as described above, the fixing piece 412 may be provided with the fixing hole 419 in order to facilitate the coupling between the substrate 410 and the case 110.

The fixing projection 117 formed in the case 110 is inserted into the fixing hole 419, thereby facilitating the coupling between the substrate 410 and the case 110.

In this configuration, the substrate 410 may include the connection piece 414 connecting the moving piece 416 with the fixing piece 412. The connection piece 414 extends from one end of the fixing piece 412 and is curved along the circumferential direction of the moving piece 416 while being spaced apart from the edge of the moving piece 416, such that the moving piece 416 can be vibrated up and down.

The through hole 411 formed in the substrate 410, that is, the through hole 411 formed by the inner space of the moving piece 416 may be larger than the outer diameter of the magnet 310.

Further, the through hole 411 may be larger than the outer diameter of the plate 320 coupled to the top surface of the magnet 310.

In this configuration, the moving piece 416 of the substrate 410 is coupled to the mass body 230, such that the substrate 410 may also be vibrated when the linear vibrator 500 according to this exemplary embodiment of the present invention is vibrated, and the substrate 410 may move to the lower side of the magnet 310.

Therefore, in order to secure the maximum vibratory force of the linear vibrator 500 according to this exemplary embodiment of the present invention, a non-contact state is required to be maintained between the substrate 410 and the magnet 310, and this non-contact state may be maintained by the through hole 411.

In other words, the substrate 410, having the through hole 411, which is larger than the outer diameter of the magnet 310, can be prevented from contacting the magnet 310 even when it is vibrated up and down, such that the motion amplitude of the vibration part 200 is not limited.

Referring to FIG. 6, the bottom surface of the substrate 410 may be provided with an electrode pad 418 for transferring electrical signals having a specific frequency to the coil 240, and the electrode pad 418 may be electrically connected to a lead wire 245 of the coil 240.

In this case, the electrode pad 418 may be provided at the outside of the coil 240 in an outer diameter direction of the coil 240, and the electrode pad 418 and one end of the lead wire 245 of the coil 240 may be electrically connected to each other by a soldering.

In other words, the electrode pad 418 is formed on the bottom surface of the moving piece 416 of the substrate 410 and may be connected with the lead wire 245 of the coil 240.

Therefore, as the electrode pad 418 of the substrate 410 is coupled to the lead wire 245 of the coil 240 from the outside of the coil 240, the lead wire 245 of the coil 240 is not affected by vibrations and motions when the linear vibrator 500 according to this exemplary embodiment of the present invention is in operation.

Figure 7:
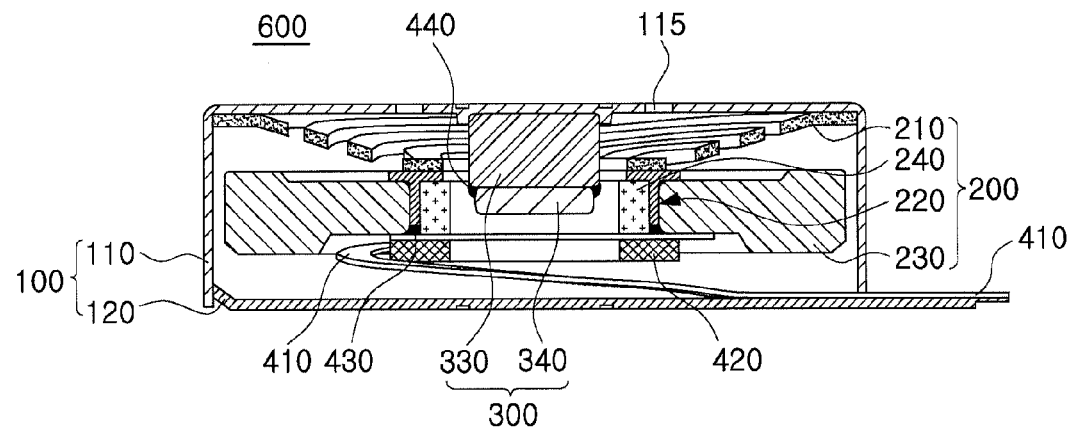
FIG. 7 is a schematic cross-sectional view showing a linear vibrator according to a second exemplary embodiment of the present invention.

FIG. 7 is a schematic cross-sectional view showing a linear vibrator according to a second exemplary embodiment of the present invention.

Referring to FIG. 7, a linear vibrator 600 according to a second exemplary embodiment of the present invention has the same components and effects as the linear vibrator 500 according to the above-mentioned first exemplary embodiment, other than a magnet 330 and a plate 24. Therefore, a description of components other than the magnet 330 and the plate 340 will be omitted.

The magnet 330 is coupled to the fixing part 100, but may also be coupled to the inner sealed surface of the case 110 of the fixing part 100, unlike the first exemplary embodiment.

Therefore, the elastic member 210 may have, in the center thereof, a hole having an outer diameter larger than that of the magnet 300, in order to prevent the magnet 300 from contacting the elastic member 210 coupled with the outer portion of the inner sealed surface of the case 110.

In this configuration, the plate 340 may be coupled to the lower surface, that is, one surface of the magnet 330 in order to smoothly form the magnetic flux flowing to the magnet 330 via the coil 240 generating the electromagnetic force by the interaction with the magnet 330.

In addition, the substrate 410 has the though hole 411 to thereby prevent contact with the magnet 330 coupled to the inner sealed surface of the case 110 when the vibration part 200 is vibrated up and down.

Figure 8:
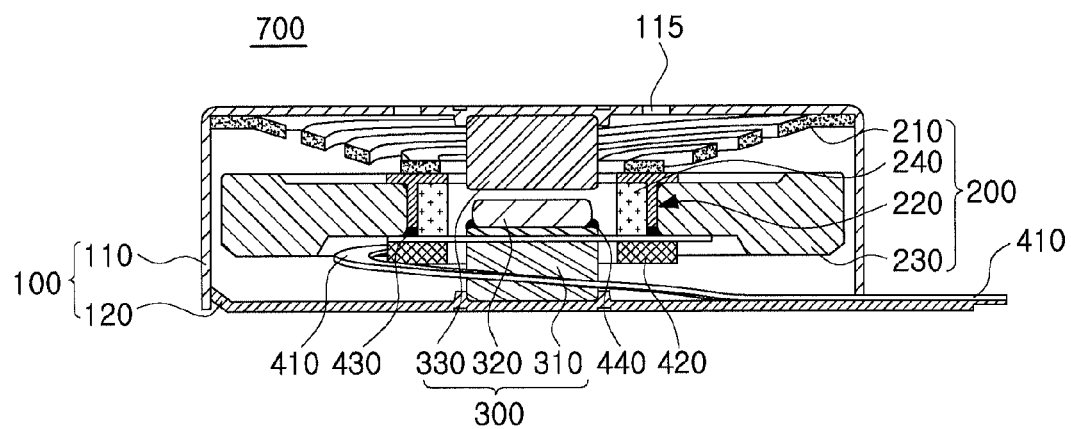
FIG. 8 is a schematic cross-sectional view showing a linear vibrator according to a third exemplary embodiment of the present invention.

FIG. 8 is a schematic cross-sectional view showing a linear vibrator according to a third exemplary embodiment of the present invention.

Referring to FIG. 8, a linear vibrator 700 according to a third exemplary embodiment of the present invention has the same components and effects as the linear vibrator 500 according to the above-mentioned first exemplary embodiment, other than the magnets 310 and 330. Therefore, a description of components, other than the magnets 310 and 330 and the plate 310, will be omitted.

The magnets 310 and 330 may include first and second magnets 310 and 330.

The second magnet 310 may be formed in contact within the inner sealed surface of the top portion of the case 110 and the first magnet 330 may be formed to be coupled to the top surface of the bracket 120.

The first and second magnets 310 and 330 are cylindrical permanent magnets, each of which has upper and lower portions magnetized with different poles to generate a magnetic field having a predetermined intensity. The first and second magnets 310 and 330 may bonded with each other by a bonding agent to be fixedly disposed on the inner sealed surface of the top portion of the case 110 and the top surface of the bracket 120.

The first and second magnets 310 and 330 may be positioned such that the respective portions thereof having the same polarity face each other in order to generate a magnetic force, and may be spaced apart from each other.

Magnetic field lines existing between the first and second magnets 310 and 330 are diffused to the outside in the radial direction by the first and second magnets 310 and 330 having the same polarities facing each other, thereby increasing magnetic efficiency. In particular, as compared to the case in which a single magnet is used, the magnetic force is concentrated on the place in which the coil 240 to be described below, disposed at the outer circumferential portions of the first and second magnets 310 and 330, is interlinked to thereby implement greater magnetic force and greater vibratory force when the same current is consumed at the same volume.

However, it is to be noted that the magnets 310 and 330 are not limited to the first and second magnets 310 and 330, and two or more magnets may be provided if the magnets are placed such that the same polarities thereof face each other.

In this configuration, the top surface, that is, one surface of the magnet 310, may be coupled to the plate 320 in order to smoothly form the magnetic flux flowing to the first magnet 310 via the coil 240 generating the electromagnetic force by the interaction with the first magnet 310.

Therefore, the magnetic field lines between the magnets 310 and 330 are diffused to the outside in the radial direction by allowing the same polarities of the plurality of magnets 310 and 330 disposed in the fixing part 100 to face each other, thereby maximizing magnetic efficiency.

Therefore, since the magnitude of the electromagnetic force can be maximized with respect to power consumption in the same volume, the maximum vibration is secured while minimizing spatial occupancy, thereby implementing stable linear vibrations.

Further, the substrate 410 has the through hole 411 to avoid contact with the first and second magnets 310 and 330 coupled to the inner sealed surface of the case 110 and one surface of the bracket 120 when the vibration part 200 is vibrated up and down.

Figure 9:
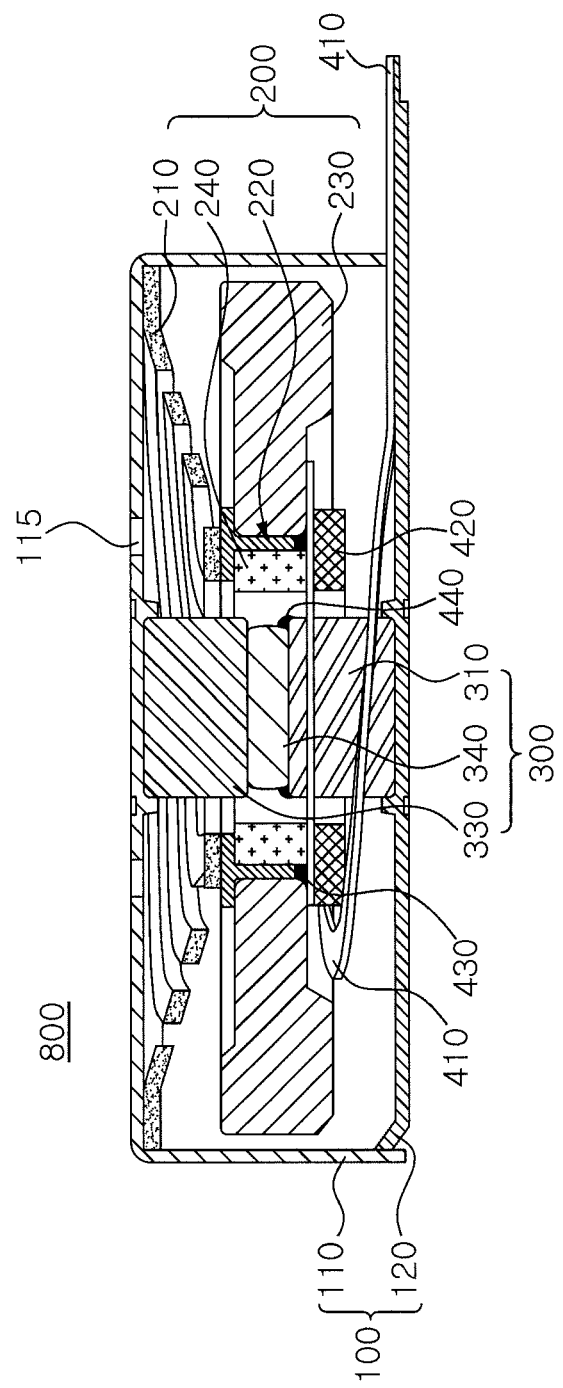
FIG. 9 is a schematic cross-sectional view showing a linear vibrator according to a fourth exemplary embodiment of the present invention.

FIG. 9 is a schematic cross-sectional view showing a linear vibrator according to a fourth exemplary embodiment of the present invention.

Referring to FIG. 9, a linear vibrator 800 according to a fourth exemplary embodiment of the present invention has the same components and effects as the third exemplary embodiment, other than the first and second magnets 310a and 330 and the plate 340, and therefore, a description of components, other than the first and second magnets 310 and 330 and the plate 340, will be omitted.

The plate 340 is disposed between the first and second magnets 310 and 330 and the top and bottom surfaces of the plate 340 may be coupled to one surface of the first magnet 310 and one surface of the second magnets 330, respectively.

In this configuration, the other surfaces of the first and second magnets 310 and 330 may be coupled to one surface of the case 110 and one surface of the bracket 120, respectively. As a result, the first and second magnets 310 and 330 and the plate 340 may be coupled together to serve as one member.

Figure 10:
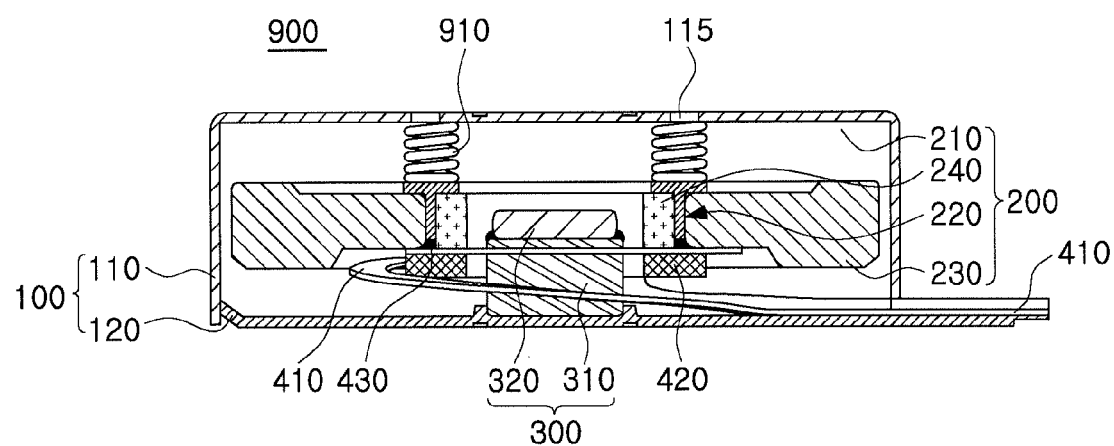
FIG. 10 is a schematic cross-sectional view showing a linear vibrator according to a fifth exemplary embodiment of the present invention.

FIG. 10 is a schematic cross-sectional view showing a linear vibrator according to a fifth exemplary embodiment of the present invention.

Referring to FIG. 10, a linear vibrator 900 according to a fifth exemplary embodiment of the present invention has the same components and effects as the above-mentioned first exemplary embodiment, other than a coil spring 910, and therefore, a description of components, other than a coil spring 910, will be omitted.

The coil spring 910 may be used as an elastic member 910 transferring vibrations of the vibration part 200, and the coil spring 910 may be coupled to the top surface of the holder 220.

According to the above-mentioned exemplary embodiments, in the linear vibrators 500, 600, 700, 800, and 900, the through hole 411 having a diameter larger than the outer diameters of the magnets 310 and 330 is formed in the substrate 410, such that the substrate 410 and the magnets 310 an 330 can be maintained in a non-contact state, thereby securing maximum vibratory force.

Further, the same polarities of the plurality of magnets 310 and 330 are disposed to face each other, the magnetic field lines between the magnets 310 and 330 are diffused to the outside in the radial direction, thereby maximizing magnetic efficiency.

Therefore, the magnitude of electromagnetic force with respect to power consumption can be maximized within the same volume, thereby implementing stable linear vibrations as the maximum vibration is secured, while minimizing spatial occupancy.

As set forth above, the linear vibration according to exemplary embodiments of the present invention can minimize the space and maximize the magnetic efficiency.

Further, the present invention prevents the vibration part and the fixing part from contacting each other, thereby making it possible to secure the maximum vibratory force and obtain the more stable linear vibrations.

While the present invention has been shown and described in connection with the exemplary embodiments, it will be apparent to those skilled in the art that modification and variation can be made without departing from the spirit and scope of the invention as defined by the appended claims.

What is claimed is:

1. A linear vibrator, comprising:
    a fixing part including a case having an internal space and a bracket coupled to the case to seal the internal space;
    at least one magnet disposed in the internal space to generate magnetic force;
    a vibration part including a coil disposed to face the magnet, and a mass body moving up and down with the coil, the coil having an inner diameter greater than an outer diameter of the magnet to form a gap between an inner surface of the coil and an outer surface of the magnet;
    an elastic member having one end coupled to the fixing part and the other end being vibrated up and down; and
    a substrate having one end coupled to the fixing part and the other end being vibrated up and down when the mass body and the coil are vibrated up and down, the substrate having a curved portion disposed outside of the magnet to transfer electrical signals to the coil, the substrate including an electrode pad formed on a surface thereof configured to be electrically connected to one end of a lead wire of the coil,
    wherein the substrate includes a moving portion coupled to the mass body and a fixing portion protruded to the outside of the case and coupled to the fixing part, and
    wherein the substrate includes a through hole through which the magnet is allowed to pass, and wherein the through hole is formed to be greater than the outer diameter of the magnet.

2. The linear vibrator of claim 1, wherein the vibration part includes a holder coupled to the other end of the elastic member by welding.

3. The linear vibrator of claim 2, wherein the holder includes a vertical part having one side contacting the coil and the other side contacting the mass body.

4. The linear vibrator of claim 1, further comprising a magnetic fluid disposed on the outer surface of the magnet to smooth a vertical motion of the vibration part.

5. The linear vibrator of claim 1, wherein the at least one magnet comprises a plurality of magnets, and the plurality of magnets are coupled to one surface of the case and to one surface of the bracket, respectively.

6. The linear vibrator of claim 1, wherein the fixing portion of the substrate is coupled to the bracket.

7. A linear vibrator, comprising:
    a fixing part including a case having an internal space and a bracket coupled to the case to seal the internal space;
    at least one magnet disposed in the internal space to generate magnetic force;
    a vibration part including a coil disposed to face the magnet, and a mass body moving up and down with the coil, the coil having an inner diameter greater than an outer diameter of the magnet to form a gap between an inner surface of the coil and an outer surface of the magnet;
    an elastic member having one end coupled to the fixing part and the other end being vibrated up and down; and
    a substrate having one end coupled to the fixing part and the other end being vibrated up and down when the mass body and the coil are vibrated up and down, the substrate having a curved portion disposed outside of the magnet to transfer electrical signals to the coil, the substrate including an electrode pad formed on a surface thereof configured to be electrically connected to one end of a lead wire of the coil,
    wherein the substrate includes a moving portion coupled to the mass body and a fixing portion protruded to the outside of the case and coupled to the fixing part, and
    wherein the substrate has a length sufficient to surround at least a portion of the outer diameter of the magnet so as to prevent the substrate from contacting the magnet.

8. The linear vibrator of claim 7, wherein the vibration part includes a holder coupled to the other end of the elastic member by welding.

9. The linear vibrator of claim 8, wherein the holder includes a vertical part having one side contacting the coil and the other side contacting the mass body.

10. The linear vibrator of claim 7, wherein the substrate includes a through hole through which the magnet is allowed to pass, and wherein the through hole is formed to be greater than the outer diameter of the magnet.

11. The linear vibrator of claim 7, further comprising a magnetic fluid disposed on the outer surface of the magnet to smooth a vertical motion of the vibration part.

12. The linear vibrator of claim 7, wherein the at least one magnet comprises a plurality of magnets, and the plurality of magnets are coupled to one surface of the case and to one surface of the bracket, respectively.

13. The linear vibrator of claim 7, wherein the fixing portion of the substrate is coupled to the bracket.

\* \* \* \* \*

UNITED STATES PATENT AND TRADEMARK OFFICE
CERTIFICATE OF CORRECTION

| | | |
|---|---|---|
| PATENT NO. | : 9,059,623 B2 | Page 1 of 1 |
| APPLICATION NO. | : 13/770490 | |
| DATED | : June 16, 2015 | |
| INVENTOR(S) | : Jun Kun Choi et al. | |

It is certified that error appears in the above-identified patent and that said Letters Patent is hereby corrected as shown below:

ON THE TITLE PAGE

Item (73) Assignee, Line 1

Delete "SASMUNG" and insert --SAMSUNG--, therefor.

Signed and Sealed this
Sixteenth Day of February, 2016

Michelle K. Lee
*Director of the United States Patent and Trademark Office*